United States Patent
Berghegger

(10) Patent No.: US 6,912,137 B2
(45) Date of Patent: Jun. 28, 2005

(54) INDUCTIVE CONTACTLESS POWER TRANSMITTER

(75) Inventor: Schroder Ralf gen Berghegger, Glandorf (DE)

(73) Assignee: Friwo Geraetebau GmbH, Ostbevern (DE)

(*) Notice: Subject to any disclaimer, the term of this patent is extended or adjusted under 35 U.S.C. 154(b) by 110 days.

(21) Appl. No.: 10/306,666

(22) Filed: Nov. 28, 2002

(65) Prior Publication Data

US 2003/0151930 A1 Aug. 14, 2003

(30) Foreign Application Priority Data

Nov. 30, 2001 (DE) .......................................... 101 58 794

(51) Int. Cl.[7] .............................................. H02M 3/335
(52) U.S. Cl. ................................................... 363/21.03
(58) Field of Search .......................... 363/16, 131, 178, 363/21.03; 307/150

(56) References Cited

U.S. PATENT DOCUMENTS

| 5,959,433 | A | 9/1999 | Rohde |
| 6,018,467 | A | 1/2000 | Majid et al. |
| 6,118,249 | A | 9/2000 | Brockmann et al. |
| 6,160,374 | A | 12/2000 | Hayes et al. |
| 6,490,176 | B2 * | 12/2002 | Holzer et al. .................. 363/20 |
| 2002/0141208 | A1 * | 10/2002 | Nanbu et al. .................. 363/37 |

FOREIGN PATENT DOCUMENTS

| DE | 3544955 | 6/1986 |
| DE | 4438387 | 5/1996 |
| DE | 19633171 | 2/1998 |
| DE | 19741279 | 3/1999 |
| JP | 11283854 | 10/1999 |

* cited by examiner

*Primary Examiner*—Shawn Riley
(74) *Attorney, Agent, or Firm*—Michael Best & Friedrich LLP

(57) ABSTRACT

The present invention relates to an inductive contactless power transmitter having a primary side including a first inductor ($L_P$) on the primary side and an oscillator for producing an alternating signal which is supplied to the inductor ($L_P$) on the primary side, and having a secondary side which includes an inductor on the secondary side that can be coupled to the inductor ($L_P$) on the primary side, a load ($R_L$) which is variable in time, and a detection means (42) for determining a power demand of the load on the secondary side, the first oscillator being a voltage-controlled oscillator having a frequency that is adjustable in response to the power demand determined by the detection means (42).

14 Claims, 4 Drawing Sheets

INDUCTIVE CONTACTLESS POWER TRANSMITTER

BACKGROUND OF THE INVENTION

The present invention relates to an inductive contactless power transmitter according to the preamble of patent claim 1. Such a power transmitter is known from U.S. Pat. No. 6,118,249.

SUMMARY OF THE INVENTION

U.S. Pat. No. 6,118,249 is concerned with the detection of a mobile part on a secondary side by an inductive charging station forming a primary side. On the secondary side, the ac voltage generated in the coil on the secondary side is rectified and supplied via a field effect transistor to a smoothing capacitor. The smoothing capacitor is discharged by a load including batteries. The field effect transistor is driven into the conductive state when the voltage at the smoothing capacitor falls below a lower value and is driven into the non-conductive state when said voltage exceeds an upper threshold value, resulting in hysteresis. The change in load effected by the switching on and off of a field effect transistor on the secondary side modulates the frequency and power input of the oscillator on the primary side. A feedback is realized in this way. The coil on the primary side is fed by a free-running oscillator. Due to the changes in load on the secondary side, the frequency of the oscillator is also changed. Said change in frequency can be determined by a simple frequency discriminator, such as a PLL (phase-locked loop), and a first control signal can be generated. Moreover, the current input of the oscillator can be measured as a voltage drop at an impedance. Said voltage drop is filtered, a second control signal being produced therefrom. In the presence of one of the two control signals, the oscillator is supplied with power. A third control signal ensures that the oscillator is switched on from time to time independently of the first two control signals.

German Offenlegungsschrift DE 197 41 279 A1 shows a device for charging batteries, the device consisting of a mobile electric device and a charging unit and inductively transmitting electrical power by means of a magnetic alternating field from a primary winding in the charging unit to a secondary winding in the mobile device. If there is no device in the charging unit or when a foreign body affects the magnetic alternating field, the charging unit should pass into a low-power waiting state. To this end, the magnetic alternating field supplied by the charging unit is produced by the primary windings of a free-running push-pull oscillator.

DE 196 33 171 A1 describes the contactless charging of batteries of a cordless hand-held apparatus via inductive transmitters which are arranged in a sub-housing. The inductive transmitters have connected thereto a control device which is also arranged in the sub-housing for controlling the charging operation and which also assumes a monitoring of the charge state of the electric energy storage devices.

U.S. Pat. No. 5,959,433 describes a universal inductive battery charger which charges a battery pack when the pack is placed on the charger. The battery pack comprises a pick-up coil for this purpose.

U.S. Pat. No. 6,160,374 describes an inductive charger as can e.g. be used for charging batteries of an electric vehicle.

A further embodiment of a known inductive contactless power transmitter is shown in FIG. 6. Typically, an alternating voltage $V_{ac}$ is supplied to the power transmitter at a frequency of 50 to 60 Hz. A switching power supply 61 converts the ac voltage $V_{ac}$ into a dc voltage $V_{dc}$ which is supplied to a resonant converter 62. The resonant converter, in turn, generates an ac voltage, typically in the range of several 100 kHz. On the secondary side there is provided an inductor $L_S$ which is magnetically coupled to the inductor $L_P$ on the primary side. The circuit 63 on the secondary side comprises a rectifier and supplies the rectified voltage to a load $R_L$. Typically, the load $R_L$ comprises batteries whose power demand decreases with an increasing load. Furthermore, the circuit 63 additionally includes a detection means for determining the power required on the secondary side. Said detection means measures either the voltage generated by the inductor $L_S$ on the secondary side or the voltage at the batteries and produces a signal therefrom that is transmitted via the feedback 64 to the primary side and controls the resonant converter 62.

It is the object of the present invention to indicate an energy-efficient, inductive contactless power transmitter.

Said object is achieved by an inductive contactless power transmitter according to claim 1.

Preferred embodiments are the subject matter of the dependent claims.

A disconnector for temporarily switching off the inductor on the primary side offers the advantage that in the switched-off state of the inductor on the primary side the power transmitter only consumes only a small amount of power.

The control of a pulse duty cycle control unit in response to the power demand on the secondary side, as determined by a detection means, offers the advantage that a sufficient amount of electrical power is always available on the secondary side and that this permits an automatic transition from a continuous to a pulsed operation.

The advantage of the combination of a continuous operation with a pulsed operation is an enlarged power range in which the power input on the primary side is adapted to the power demand on the secondary side without an unnecessarily large amount of energy being consumed on the primary side.

The separation of the continuous operation from the pulsed operation by a threshold value offers the advantage that the more energy-efficient continuous operation is exploited in an optimum way.

The advantage of an optical transmission path is that control signals need not be modulated on the secondary side to the high currents and voltages used for power transmission and that said high voltages and currents need not be filtered out therefrom on the primary side. Rather, the optical interface exclusively serves to transmit data from the secondary side to the primary side. An optical transmission path further offers the advantage that it does not lead to an electrical coupling between primary side and secondary side.

A modulation of the data transmitted from the secondary side via the photodiode to the photodetector on the primary side leads to reduced sensitivity to ambient light.

The supplementing of the inductor on the primary side by a capacitor to obtain a serial resonant circuit has the advantage that the power transmission from the primary side to the secondary side is improved. Advantageously, the highest frequency that can be produced by the voltage-controlled oscillator is chosen to be equal to the resonant frequency of said serial resonant circuit.

The use of a short-circuit switch or of a disconnector switch is that an existing interface is used for the data transmission from the secondary side to the primary side.

The generation of pulses (whose duration is short in comparison with the period duration of the alternating signal produced by the voltage-controlled oscillator) by a short-circuit switch or a disconnector switch has the advantage that the power transmission is only impaired for a short period of time. Furthermore, such pulses clearly differ from the alternating signal used for power transmission, so that they can be filtered out from the alternating signal on the primary side with relatively small efforts regarding the circuitry.

The use of frequency modulation for transmitting the power demand on the secondary side, as determined by the detection means, by means of a pulse train to the primary side, and of the frequency-to-voltage converter thus needed on the primary side has the advantage that the frequency modulation is interference insensitive relative to amplitude variations resulting from the phase position changing in time between the signals supplied by the two oscillators. Moreover, a frequency-to-voltage converter can be realized by a few components. To modulate the frequency of the pulses, a second voltage-controlled oscillator is advantageously used on the secondary side.

Advantageously, the frequency-to-voltage converter evaluates the signal supplied by the pulse detector only if power is transmitted from the primary side to the secondary side, i.e. an alternating signal is supplied to the inductor on the primary side, because, otherwise, no pulses can be transmitted and the pulse packet control would thus be regulated in a faulty way.

BRIEF DESCRIPTION OF THE DRAWINGS

Preferred embodiments will now be explained in the following in more detail with reference to the enclosed drawings, in which:

FIG. 1b shows a simplified basic circuit according to 1a;

FIG. 1a shows a basic circuit for driving an inductive resonant transmitter. The basic circuit includes a first and second switch S1 and S2, a first and second diode D1 and D2, two large capacitors C1 and C2, two small capacitors C3 and C4, a resonant capacitor $C_P$ as well as an inductor $L_P$ on the primary side. Nodes N1 and N1 are additionally plotted in FIG. 1.

The inductor $L_P$ on the primary side forms a resonant circuit with the resonant capacitor $C_P$. The circuit operates at an oscillator frequency $f_O$, which is excited by switches S1 and S2. Whenever following the switching off of one of the switches the inductor $L_P$ on the primary side produces—at node N1—a voltage which is by the conducting-state voltage of the diode D1 above the operating voltage $U_B$, said voltage is short-circuited by the diode D1 towards the operating voltage $U_B$. Likewise, an under-voltage at node N1 which is below mass by the conducting-state voltage of diode D2 is short-circuited against mass. The small capacitors C3 and C4 serve interference suppression because they short-circuit high-frequency signals that are created during opening and closing of the switches or MOSFETs and when diodes D1 and D2 become conductive.

The large capacitors C1 and C2 are electrolyte capacitors in one embodiment. They serve to stabilize the operating voltage $U_B$ and form a virtual mass on node N2, so that voltage $U_B/2$ is here applied. That is why the capacitors C1 and C2 as well as the resonant capacitor $C_P$ must have a dielectric strength of slightly more than $U_B/2$.

Figure 1A:
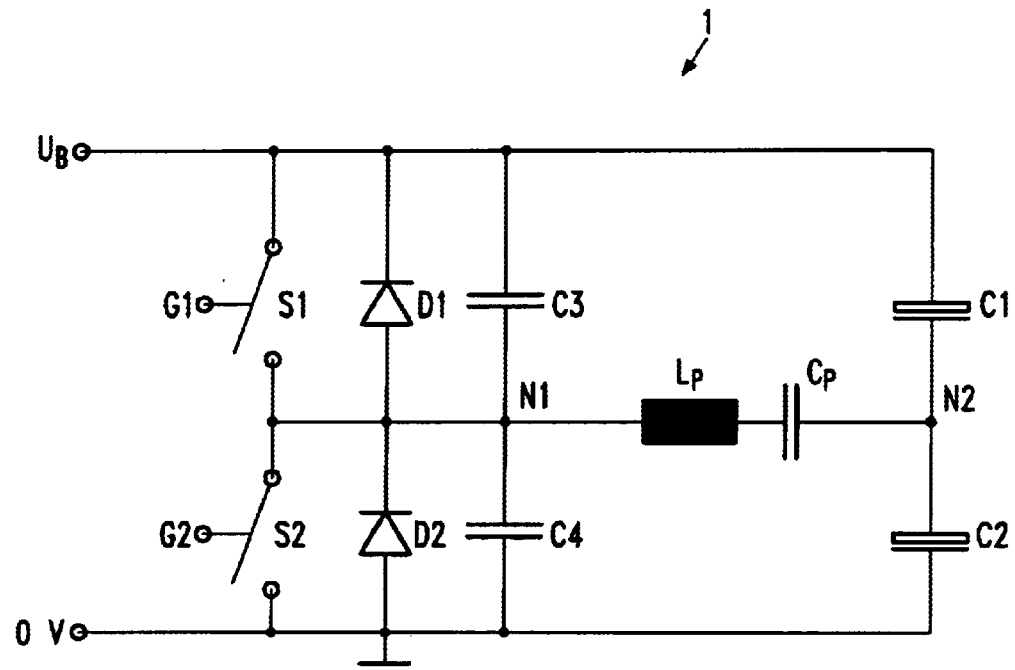
FIG. 1a shows a basic circuit for driving the inductor of a resonant transmitter on the primary side.
Figure 1B:
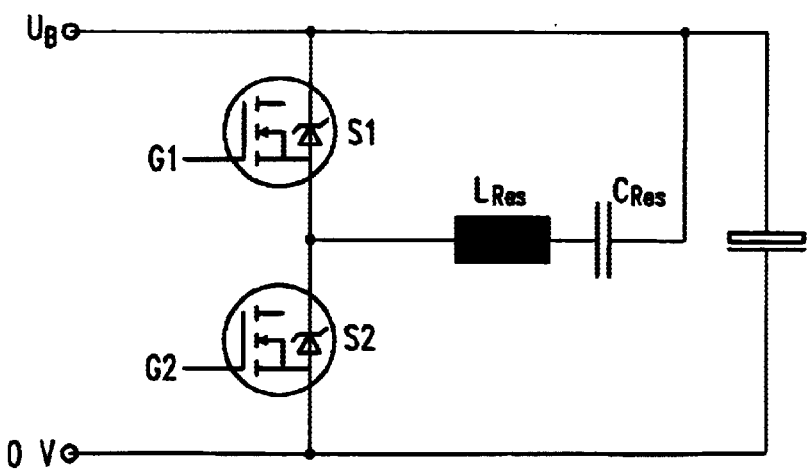

An embodiment which is simplified in comparison with the above description is shown in FIG. 1b. Switches S1 and S2 are here replaced by MOSFETs (MOSFET: metal oxide semiconductor field effect transistor). The diodes D1 and D2 can be omitted; their functions are taken over by the inverse diodes of the MOSFETs. Moreover, a capacitor C1 or C2 can be replaced by a short-circuit link by connecting $L_P$ and $C_P$ to the operating voltage. In this form the circuit operates in an unchanged way, but a dc voltage of Ub/2 is superposed on $C_P$. In these embodiments the respectively other capacitor and the resonant capacitor $C_P$ must have a dielectric strength higher than the operating voltage $U_B$.

Figure 4:
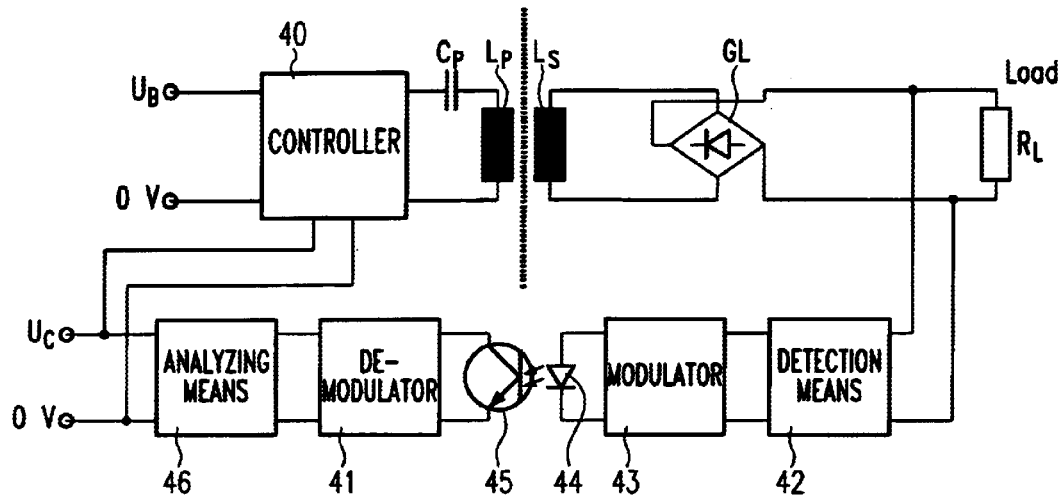
FIG. 4 shows a resonant transmitter with an optical feedback path.
Figure 5:
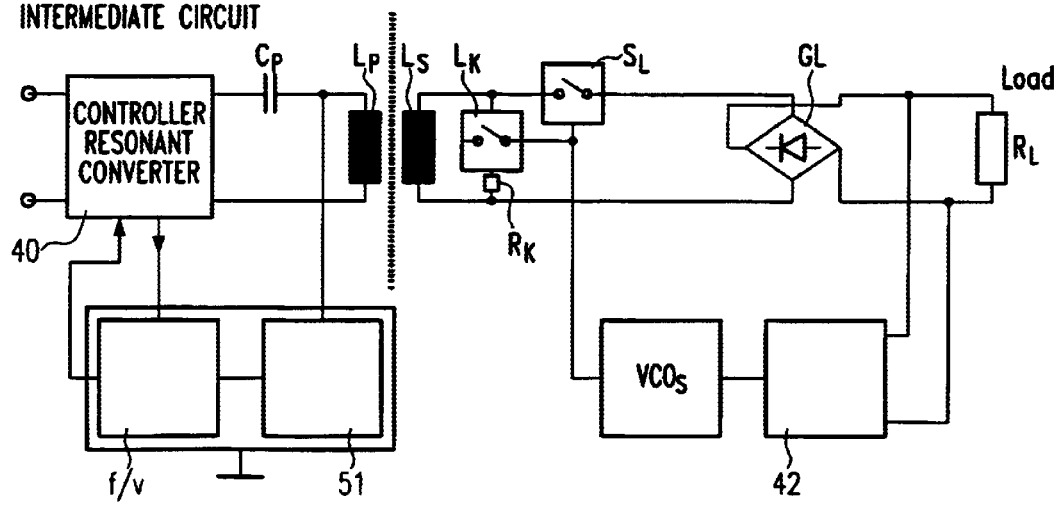
FIG. 5 shows a resonant transmitter in which the two magnetically coupled inductors are used for transmitting the feedback signal.
Figure 6:
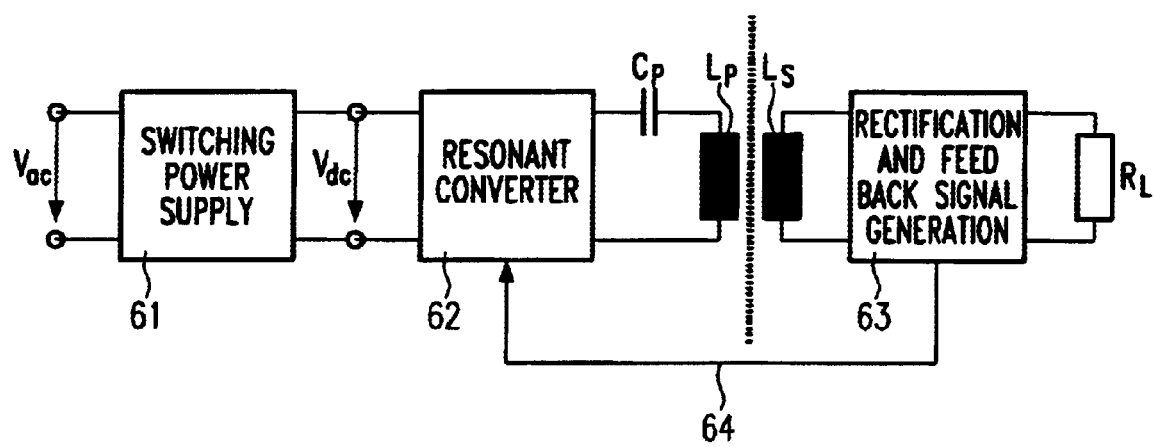
FIG. 6 shows a resonant transmitter according to the prior art.

In the charge mode the inductor $L_P$ on the primary side is magnetically coupled with an inductor $L_S$ on the secondary side, as shown in FIGS. 4 and 5. Without a load on the impedance $L_S$ on the secondary side, the switches S1 and S2 are opened and closed at a higher frequency than the resonant frequency of the resonant circuit which is formed by the inductor $L_P$ on the primary side and the resonant capacitor $C_P$. A load on the coil on the secondary side results in a change in impedance of the coil $L_S$ on the secondary side and thus in an off-resonance setting of the resonant circuit towards higher frequencies. As a consequence, at a constant oscillator frequency $f_O$, the oscillation frequency approaches the resonant frequency, whereby the transmitted power increases. To avoid switching looses and high-frequency disturbances, switching is carried out in the voltage-free state. This is referred to as ZVS (zero voltage switching).

When switch S2 is switched off, the current is first maintained by inductor $L_P$. As a result, the voltage on node N1 rises, with the small capacitor C3 being discharged and the small capacitor C4 charged. Finally, when the voltage on node N1 exceeds the operating voltage $U_B$ by the diode forward voltage of diode D1, diode D1 becomes conductive, thereby defining the voltage on node N1. It is only now that switch S1 is activated. After switch S1 has been deactivated, switch S2 will only be activated when the voltage on node N1 falls below 0V by the forward voltage of diode D2.

Figure 2:
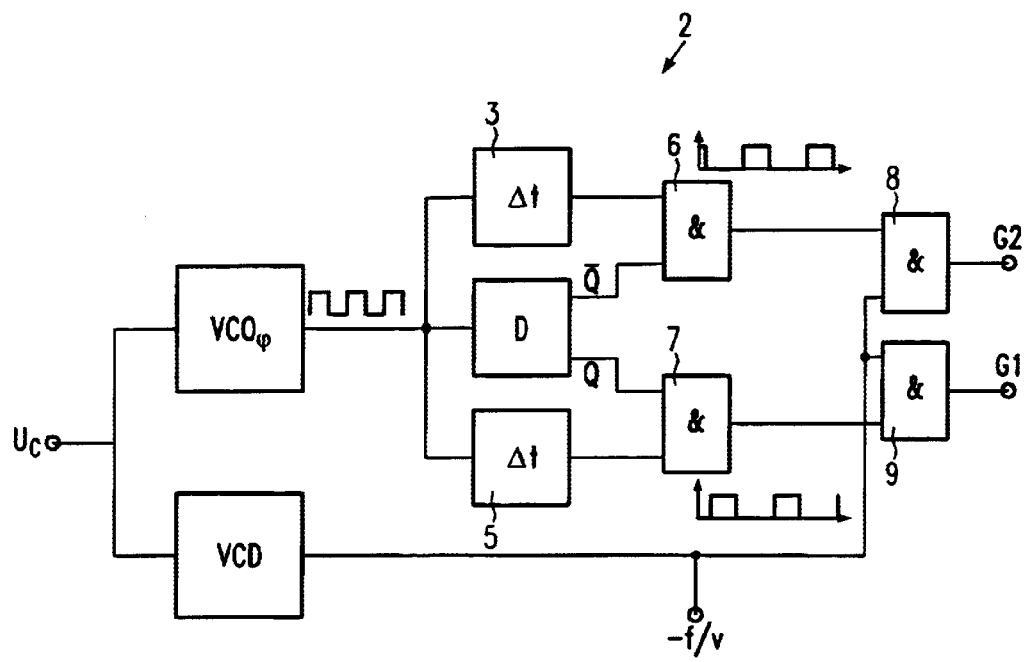
FIG. 2 shows a drive circuit for the switches of the basic circuit shown in FIG. 1.

According to a preferred embodiment the control electrodes G1 and G2 are controlled by the drive circuit 2 shown in FIG. 2. The drive circuit 2 comprises a voltage-controlled oscillator (VCO$_P$), two delay elements 3 and 5, a delay flip-flop D and gates 6, 7, 8, 9 as well as a duty cycle control unit VCD. Both the voltage-controlled oscillator VCO$_P$ and the duty cycle control unit VCD have a control signal U$_C$ supplied thereto. The control signal U$_C$ depends on the power demand of the secondary side. It will be explained further below with reference to FIGS. 4 and 5 how the control signal is generated.

In one embodiment the control signal is an analog voltage which can vary between an upper and a lower limit value. In one embodiment the control signal U$_C$ has its maximum voltage at a maximum output load on the secondary side. Under these circumstances the voltage-controlled oscillator VCO$_P$ produces its minimum frequency. This corresponds to the resonant frequency of the resonant circuit. When the load on the secondary side decreases, the voltage of the control signal decreases as well. As a result, the voltage-controlled oscillator $VCO_P$ produces an increasing frequency that shifts the oscillator frequency $f_O$ relative to the resonant frequency of the resonant circuit formed by $L_P$ and $C_P$. At this point the control signal $U_C$ reaches a threshold value.

A further reduction of the transmitted power is achieved with the help of the voltage-controlled duty cycle control unit VCD. The duty cycle control unit produces a frequency that is small in comparison with the oscillator frequency $VCO_P$. Small in this context means smaller than half as great. Depending on the control signal $U_C$, the duty cycle control unit changes the duty ratio of the output signal. When the control signal $U_C$ has a value above the threshold value, the duty ratio is 100%, so that the duty cycle control unit always outputs a logic one. This means in the case of a CMOS logic (complementary metal oxide semiconductor) that the duty cycle control unit outputs a voltage slightly below the operating voltage $U_B$. It is only when the control signal falls below the threshold value that the duty cycle control unit actually outputs an ac voltage. With a decreasing control signal the duty ratio becomes smaller and smaller, and even when the control signal $U_C$ assumes its minimum value, the duty ratio remains still greater than zero. For instance, the smallest adjustable duty ratio may be 1 or 0.1%. As will be explained further below, it can no longer be detected at a duty cycle ratio of 0 whether a secondary side is magnetically coupled with the primary side, i.e. whether e.g. a mobile device is placed in the charging tray.

Figure 3:
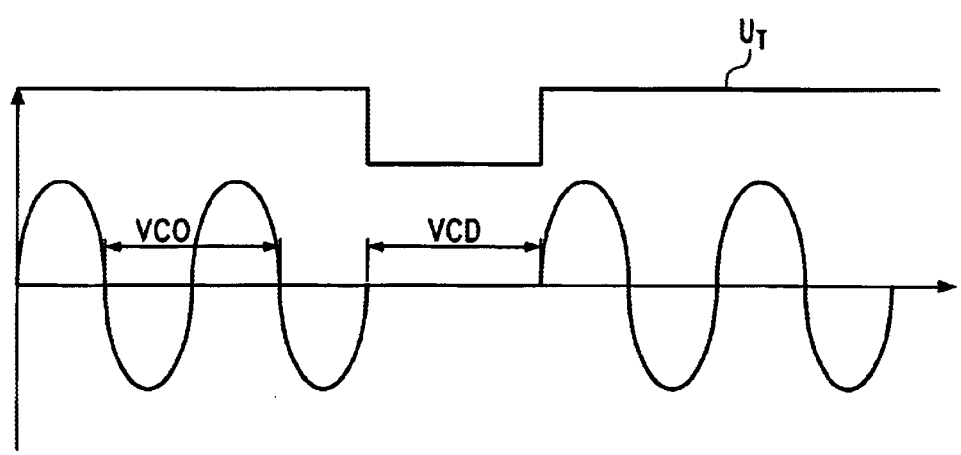
FIG. 3 shows a diagram for explaining the influence of a voltage-controlled oscillator and of a duty cycle control unit.

The alternating signal of the voltage-controlled oscillator $VCO_P$ on the primary side is supplied to the two delay elements 3 and 5 and to the delay flip-flop D. The output $\overline{Q}$ of the delay flip-flop D and the output of the delay element 3 are supplied to the AND gate 6. The output Q of the delay flip-flop D and the output of the delay element 5 are supplied to the AND gate 7. At the outputs of the AND gates 6 and 7, two output signals that are phase-shifted by 180° are thereby created at a duty ratio of slightly below 50% for controlling switches S1 and S2. Thanks to the ANDing of the duty signal $U_T$ with the output signals of the AND gates 6 and 7 in the AND gates 8 and 9, ac voltage is supplied at times to the control electrodes G1 and G2 in accordance with the duty signal $U_T$ and is not supplied at times. This is shown in FIG. 3. While the duty signal is at a high level, which corresponds to a logic one, ac voltage is supplied to the control electrodes G1 and G2 and thus to the resonant circuit consisting of $L_P$ and $C_P$. The frequency of the ac voltage is determined by the voltage-controlled oscillator VCO. While the duty signal has a low level, no ac voltage is passed on through the AND gates 8 and 9. In another embodiment, the AND gates 6 and 8 and the AND gates 7 and 9 may each be realized by an AND gate with three inputs.

In another embodiment, the operating ranges of the voltage-controlled oscillator $VCO_P$ and the duty cycle control unit VCD are overlapping, so that a central range exists in which upon a change in the control signal both the duty ratio of the duty signal $U_T$ and the frequency of the alternating signal are changed. Apart from such a transitional range, there may be an upper range in which a change in the control signal $U_C$ just influences the frequency of the voltage-controlled oscillator $VCO_P$ on the primary side and a lower range in which a change in the control signal $U_C$ just influences the duty cycle ratio of the duty signal $U_T$.

An embodiment of the feedback of the load on the secondary side to the primary side will be explained with reference to FIG. 4. FIG. 4 shows a controller 40, the resonant circuit formed by $L_P$ and $C_P$, the inductor $L_S$ on the secondary side, a rectifier GL, a load $R_L$, a detection means 42, a modulator 43, a photodiode 44, a photoelement 45, a demodulator 41, and an analyzing means 46.

Circuit 40 substantially contains the drive circuit 2 shown in FIG. 2 and the basic circuit 1 shown in FIG. 1 and used for driving the inductor $L_P$ and the resonant capacitor $C_P$ on the primary side. The inductor $L_S$ on the secondary side is magnetically coupled to the inductor $L_P$ on the primary side. The ac voltage supplied by the inductor on the secondary side is rectified in the rectifier GL and supplied to a load $R_L$. The load $R_L$ can also include batteries so that the power required by the batteries decreases with an increasing load. In this instance the power required by load $R_L$ is variable in time.

A detection means 42 determines the power demand on the secondary side. The detection means 42 can e.g. measure the voltage decreasing on the load, the voltage across the batteries or also the load current. The output signal of the detection means is preferably an analog voltage which is supplied to the modulator 43. Said modulator modulates the voltage supplied by the detection means 42 to a carrier signal and controls the photodiode 44. The light of the photodiode 44 impinges on a photoelement which can e.g. be realized as the phototransistor. The output signal supplied by the photoelement is demodulated in the demodulator 41 and analyzed in the analyzing means 46 and thus converted into the control signal $U_C$. The demodulation operation takes place in the reverse order compared to the modulation operation.

Sensitivity to ambient light, which can also impinge on the photoelement, can be reduced by modulating the output signal supplied by the detection means. In particular, ambient light variations are most of the time slow and not periodic, so that they clearly differ from a modulated signal. Frequency modulation can advantageously be employed as a kind of modulation.

The primary side can e.g. be designed as a charging tray while the secondary side may be a mobile or cordless telephone or also an electric toothbrush. Charging tray and secondary device are designed such that the secondary device can easily be removed from the charging tray and that upon insertion of the secondary device into the charging tray the two inductors $L_P$ and $L_S$ are closely positioned side by side, so that a magnetic coupling takes place. The photodiode 44 is also positioned near the photoelement when the secondary device is inserted in the charging tray, so that a sufficiently large amount of the light produced by the photodiode 44 impinges on the photoelement.

FIG. 5 shows an embodiment in which in contrast to FIG. 4 a signal about the power demand on the secondary side is transmitted via the two inductors $L_P$ and $L_S$ to the primary side. FIG. 5 shows a controller 40, a resonant circuit formed by $L_P$ and $C_P$, the inductor $L_S$ on the secondary side, a short-circuit switch $S_K$ as well as a disconnector switch $S_L$, a short-circuit resistor $R_K$, a rectifier GL, a load $R_L$, a detection means 42, a voltage-controlled oscillator $VCO_S$ on the secondary side, a pulse detector 51, as well as a frequency-to-voltage converter f/v.

As described above, the detection means 42 determines the power required on the secondary side. It outputs an analog voltage. The voltage-controlled oscillator $VCO_S$ controls either the short-circuit switch $S_K$, the disconnector switch $S_L$ or both types of switches $S_K$ and $S_L$ together. To avoid undesired power loss, the short-circuit switch $S_K$ is only closed for a very short period of time, i.e. considerably shorter than the period duration of the alternating signal supplied by the voltage-controlled oscillator $VCO_P$ on the primary side. Moreover, the frequency of the voltage-controlled oscillator $VCO_S$ on the primary side is lower than the frequency supplied by the voltage-controlled $VCO_P$ on the primary side. To this end the voltage-controlled oscillator $VCO_S$ on the secondary side supplies an alternating signal the duty ratio of which is almost zero or one.

The short circuit on the secondary side creates a drop in the oscillator voltage on the primary side, said drop being detectable. Since each real switch and each real line has a resistor, said resistor was explicitly plotted as $R_K$ in the circuit diagram. The short-circuit resistance $R_K$ can be chosen to be so high that on the primary side the pulse detector 51 can detect a voltage drop with a sufficient noise ratio. It is thus not necessary that the short-circuit switch $S_K$ and the short-circuit resistor $R_K$ actually short-circuit the inductor $L_S$ on the secondary side, i.e. $R_K$ is actually lower than the resistance of the inductor $L_S$ on the secondary side. The designations "short-circuit switch" and "short-circuit resistor" were chosen because they illustrate the connecting together of the two elements with the inductor $L_S$ on the secondary side.

In another embodiment a disconnector switch $S_L$ may also be connected between the inductor $L_S$ and the rectifier GL on the secondary side. The opening of the disconnector switch leads—on the primary side—to a rise in voltage at the inductor $L_P$ on the primary side. The disconnector switch $S_L$ is only opened for a short period of time in comparison with the period duration of the alternating signal supplied by the voltage-controlled oscillator $VCO_P$ on the primary side. The power supply of the load on the secondary side is disturbed in this way only slightly. For this purpose, the disconnector switch is also operated at a frequency below the frequency used for power transmission.

In a third embodiment, both short-circuit switch SK and disconnector switch LS are provided. They are preferably switched one after the other, so that the short-circuit switch is first short-circuited and directly thereafter the disconnector is opened, or vice versa. This first of all creates a drop on the primary side, followed by an increase in voltage, or vice versa. An improvement of the noise ratio and thus a reliable detection of the pulses on the primary side can thereby be carried out.

On the primary side a pulse detector 51 is provided for detecting the voltage increases or voltage drops on the inductor on the primary side. Since the drops or increases are short in comparison with the period duration of the alternating signal used for power transmission, they can be detected with little effort. The pulse detector may e.g. consist of a high-pass filter. A pulse shaper may be provided after the high-pass filter, so that the signal produced by the voltage-controlled oscillator $VCO_S$ on the secondary side is regenerated on the primary side after the pulse detector, for the pulse height is modulated with the alternating signal used for power transmission. That is why it is more advantageous to encode the information to be transmitted by frequency modulation into the time sequence of the pulses than to use an amplitude modulation. Moreover, an amplitude modulation would not be possible by switching on and off the switches $S_K$ and/or $S_L$ alone. Subsequently, the control signal $U_C$ which is supplied to the voltage-controlled oscillator $VCO_P$ on the primary side and the duty cycle control unit $VC_D$ is produced in a frequency-to-voltage converter f/v.

The duty signal $U_T$, in turn, which is produced by the duty cycle control unit, is supplied to the frequency-to-voltage converter f/v. The frequency-to-voltage converter f/v will only change its output voltage if power is transmitted to the secondary side because it is only then that data can be transmitted from the secondary side to the primary side. Otherwise, the voltage-controlled oscillator $VCO_P$ and the duty cycle control unit VDC on the primary side would be controlled in a wrong way. This e.g. prevents a possible heating by foreign bodies.

What is claimed is:

1. Inductive contactless power transmitter comprising:
   a primary side including:
      a first inductor ($L_P$) on the primary side;
      a first oscillator for producing an alternating signal which is supplied to said inductor ($L_P$) on the primary side;
   a secondary side including:
      an inductor ($L_S$) on the secondary side which can be coupled to said inductor ($L_P$) on the primary side;
      a load ($R_L$) which is variable in time or constant; and
      a detection mans (42) for determining a power demand of said load on the secondary side,
   characterized in that
   said first oscillator is a voltage-controlled oscillator ($VCO_P$) having a frequency which is adjustable in response to the power demand determined by said detection means (42).

2. Power transmitter according to claim 1, characterized in that said primary side includes a disconnector (VCD, 8, 9) for temporarily preventing the alternating signal produced by said oscillator ($VCO_P$) from being supplied to said inductor ($L_P$) on the primary side.

3. Power transmitter according to claim 2, characterized in that said disconnector comprises a voltage-controlled duty cycle control unit (VCD) and logic gates (8,9 9), said duty cycle control unit producing a duty signal ($U_T$) which controls said logic gates, said duty cycle control unit controlling the duty ratio of said duty signal in dependence upon the power demand determined by said detection means, and said alternating signal being supplied to said logic gates in addition to said duty signal.

4. Power transmitter according to claim 3, characterized in that in the case of a small power demand the primary side is adapted to a slightly changed power demand on the secondary side mainly by increasing or reducing the duty ratio, whereas in the case of a high power demand the primary side is mainly adapted to a slightly changed power demand by increasing or decreasing the frequency of said oscillator.

5. Power transmitter according to claim 4, characterized in that a threshold value is provided for the power demand on the secondary side, the primary side below the threshold value adapting said duty cycle control unit to the power demand on the secondary side by changing the duty ratio, said first oscillator ($VCO_P$) producing its maximum or minimum frequency, and the primary side above the threshold value being adapted to the power demand on the secondary side by changing the frequency of said first oscillator ($VCO_P$) between a minimum and the maximum frequency, said duty cycle control unit holding the duty ratio at 100%.

6. Power transmitter according to any one of the above claims, characterized by a photodiode (44) on the secondary side and a photodetector (45) and an analyzing means (46) on the primary side, said photodiode (44) being optically coupled with said photodetector, said detection means (42) controlling said photodiode, and said analyzing means (46) supplying a voltage signal to said first oscillator ($VCO_P$), said voltage signal depending on the signal supplied by said photodetector.

7. Power transmitter according to claim 6, characterized in that a modulator (43) is further provided on the secondary side and a demodulator (41) on the primary side, said modulator (43) being fed with the output signal of said detection means (42) and said modulator directly driving said photodiode, and the signal supplied by said photodetector being supplied to said demodulator (41) and the output signal thereof being supplied to said analyzing means.

8. Power transmitter according to any one of the above claims, characterized in that a capacitor ($C_P$) is connected on the primary side in series with said inductor ($L_P$) on the primary side, the resonant frequency from said inductor ($L_P$) and capacitor ($C_P$) on the primary side being equal to the maximum or minimum frequency of said first oscillator ($VCO_P$).

9. Power transmitter according to any one of claims 1 to 5, characterized in that a short-circuit switch ($S_K$) which is opened and closed by said detection means (42) in a controlled way is provided on the secondary side in parallel with said inductor ($L_S$) on the secondary side.

10. Power transmitter according to any one of claims 1 to 5 or 9, characterized in that said inductor on the secondary side is connected via a disconnector switch ($S_L$) to the load, so that said disconnector switch ($S_L$) can separate said inductor ($L_S$) on the secondary side from said load ($R_L$), said disconnector switch ($S_L$) being controlled by said detection means (42).

11. Power transmitter according to claim 9 or 10, characterized in that on the primary side a pulse detector (51) is provided for detecting pulses whose duration is short or long in comparison with the period duration of said alternating signal produced by said first oscillator ($VCO_P$), the output signal of said pulse detector (51) controlling said first oscillator ($VCO_P$).

12. Power transmitter according to claim 11, characterized in that on the primary side there is further provided a frequency-to-voltage converter (f/v) which has supplied thereto the output signal of said pulse detector (51) and supplies a voltage ($U_T$) to said first oscillator ($VCO_P$).

13. Power transmitter according to any one of claims 9 to 12, characterized in that on the secondary side a second voltage-controlled oscillator ($VCO_S$) is provided which has supplied thereto a control voltage produced by said detection means (42), said second oscillator ($VCO_S$) controlling said short-circuit switch ($S_K$) and/or said disconnector switch ($S_L$), said second oscillator ($VCO_S$) producing pulses of a pulse duration which is short or long in comparison with the period duration of said alternating signal produced by said first oscillator ($VCO_P$), and whose frequency is low or high in comparison with that of said alternating signal.

14. Power transmitter according to claim 12, as far as it refers back to claim 3, characterized in that the duty signal of said duty cycle control unit (VDC) is supplied to the frequency-to-voltage converter (f/v) and the frequency-to-voltage converter (f/v) will only change the voltage on the basis of the signal supplied by said pulse detector if said alternating signal of said first oscillator ($VCD_P$) is supplied to said inductor on the primary side and said frequency-to-voltage converter (f/v) keeps the voltage otherwise constant.

* * * * *

UNITED STATES PATENT AND TRADEMARK OFFICE
CERTIFICATE OF CORRECTION

PATENT NO. : 6,912,137 B2
DATED : June 28, 2005
INVENTOR(S) : Schroder Ralf gen. Berghegger It is certified that error appears in the above-identified patent and that said Letters Patent is hereby corrected as shown below:

<u>Column 8, line 9 through Column 10, line 29,</u>
Replace Claims 1 through 14 in their entirety with the following:

What is claimed is:

1. Inductive contactless power transmitter comprising:

a primary side including:

a first inductor ($L_P$) on the primary side;

a first oscillator for producing an alternating signal which is supplied to said inductor ($L_P$) on the primary side;

a secondary side including:

an inductor ($L_S$) on the secondary side which can be coupled to said inductor ($L_P$) on the primary side;

a load ($R_L$) which is variable in time or constant; and a detection means (42) for determining a power demand of said load on the secondary side, and wherein said first oscillator is a voltage-controlled oscillator ($VCO_P$) having a frequency which is adjustable in response to the power demand determined by said detection means (42).

2. Power transmitter according to claim 1, wherein said primary side includes a disconnector (VCD, 8, 9) for temporarily preventing the alternating signal produced by said oscillator ($VCO_P$) from being supplied to said inductor ($L_P$) on the primary side.

3. Power transmitter according to claim 2, wherein said disconnector comprises a voltage-controlled duty cycle control unit (VCD) and logic gates (8,9 9), said duty cycle control unit producing a duty signal ($U_T$) which controls said logic gates, said duty cycle control unit controlling the duty ratio of said duty signal in dependence upon the power demand determined by said detection means, and said alternating signal being supplied to said logic gates in addition to said duty signal.

4. Power transmitter according to claim 3, wherein in the case of a small power demand, the primary side is adapted to a slightly changed power demand on the secondary side mainly by increasing or reducing the duty ratio, whereas in the case of a high power demand the primary side is mainly adapted to a slightly changed power demand by increasing or decreasing the frequency of said oscillator.

UNITED STATES PATENT AND TRADEMARK OFFICE
CERTIFICATE OF CORRECTION

PATENT NO. : 6,912,137 B2
DATED : June 28, 2005
INVENTOR(S) : Schroder Ralf gen. Berghegger It is certified that error appears in the above-identified patent and that said Letters Patent is hereby corrected as shown below:

Column 8, line 9 through Column 10, line 29 (cont'd),

5. Power transmitter according to claim 4, wherein a threshold value is provided for the power demand on the secondary side, the primary side below the threshold value adapting said duty cycle control unit to the power demand on the secondary side by changing the duty ratio, said first oscillator ($VCO_P$) producing its maximum or minimum frequency, and the primary side above the threshold value being adapted to the power demand on the secondary side by changing the frequency of said first oscillator ($VCO_P$) between a minimum and the maximum frequency, said duty cycle control unit holding the duty ratio at 100%.

6. Power transmitter according to any one of the above claims, and further comprising a photodiode (44) on the secondary side and a photodetector (45) and an analyzing means (46) on the primary side, said photodiode (44) being optically coupled with said photodetector, said detection means (42) controlling said photodiode, and said analyzing means (46) supplying a voltage signal to said first oscillator ($VCO_P$), said voltage signal depending on the signal supplied by said photodetector.

7. Power transmitter according to claim 6, and further comprising a modulator (43) provided on the secondary side and a demodulator (41) on the primary side, said modulator (43) being fed with the output signal of said detection means (42) and said modulator directly driving said photodiode, and the signal supplied by said photodetector being supplied to said demodulator (41) and the output signal thereof being supplied to said analyzing means.

8. Power transmitter according to any one of the above claims, and further comprising a capacitor ($C_P$) on the primary side connected in series with said inductor ($L_P$) on the primary side, the resonant frequency from said inductor ($L_P$) and capacitor ($C_P$) on the primary side being equal to the maximum or minimum frequency of said first oscillator ($VCO_P$).

9. Power transmitter according to any one of claims 1 to 5, and further comprising a short-circuit switch ($S_K$) which is opened and closed by said detection means (42) in a controlled way is provided on the secondary side in parallel with said inductor ($L_S$) on the secondary side.

10. Power transmitter according to claim 1 and wherein said inductor on the secondary side is connected via a disconnector switch ($S_L$) to the load, so that said disconnector switch ($S_L$) can separate said inductor ($L_S$) on the secondary side from said load ($R_L$), said disconnector switch ($S_L$) being controlled by said detection means (42).

11. Power transmitter according to claim 9 and further comprising on the primary side a pulse detector (51) for detecting pulses whose duration is short or long in comparison with the period duration of said alternating signal produced by said first oscillator ($VCO_P$), the output signal of said pulse detector (51) controlling said first oscillator ($VCO_P$).

12. Power transmitter according to claim 11, and further comprising on the primary side a frequency-to-voltage converter (f/v) which has supplied thereto the output signal of said pulse detector (51) and supplies a voltage ($U_T$) to said first oscillator ($VCO_P$).

UNITED STATES PATENT AND TRADEMARK OFFICE
CERTIFICATE OF CORRECTION

PATENT NO. : 6,912,137 B2
DATED : June 28, 2005
INVENTOR(S) : Schroder Ralf gen. Berghegger It is certified that error appears in the above-identified patent and that said Letters Patent is hereby corrected as shown below:

Column 8, line 9 through Column 10, line 29 (cont'd),

13.    Power transmitter according to claim 9, and further comprising on the secondary side a second voltage-controlled oscillator (VCO$_S$) is provided which has supplied thereto a control voltage produced by said detection means (42), said second oscillator (VCO$_S$) controlling said short-circuit switch (S$_K$) and/or said disconnector switch (S$_L$), said second oscillator (VCO$_S$) producing pulses of a pulse duration which is short or long in comparison with the period duration of said alternating signal produced by said first oscillator (VCO$_P$), and whose frequency is low or high in comparison with that of said alternating signal.

14.    Power transmitter according to claim 12, wherein the duty signal of said duty cycle control unit (VDC) is supplied to the frequency-to-voltage converter (f/v) and the frequency-to-voltage converter (f/v) will only change the voltage on the basis of the signal supplied by said pulse detector if said alternating signal of said first oscillator (VCD$_P$) is supplied to said inductor on the primary side and said frequency-to-voltage converter (f/v) keeps the voltage otherwise constant.

Signed and Sealed this

Sixth Day of December, 2005

JON W. DUDAS
*Director of the United States Patent and Trademark Office*